Sept. 18, 1962
T. R. KOMLINE
3,054,663
COMPOSTING APPARATUS
Filed Aug. 27, 1959
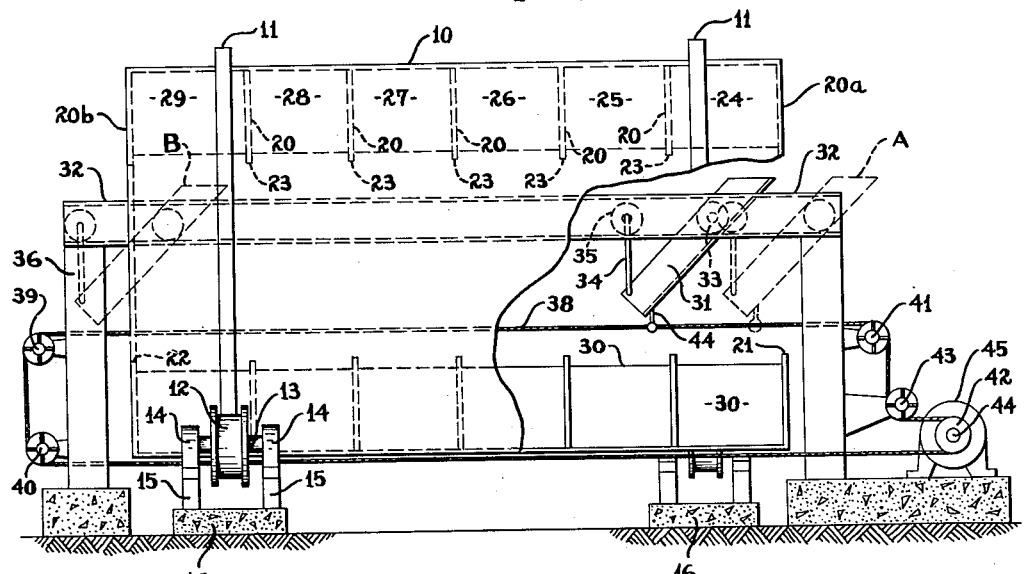
Fig. 1
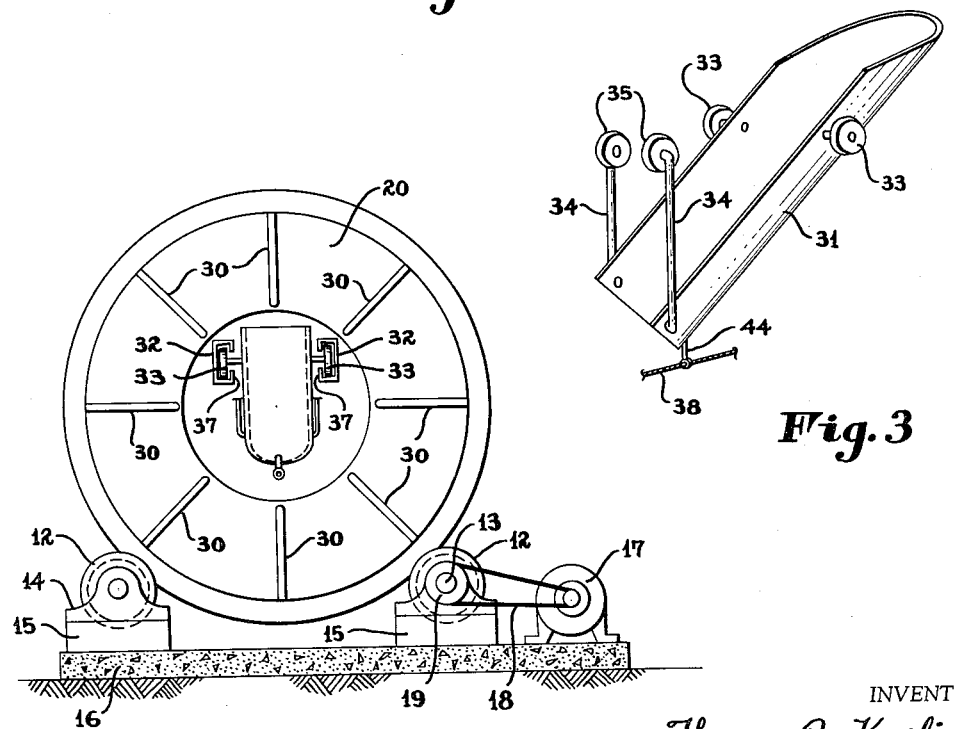
Fig. 2
Fig. 3
INVENTOR
Thomas R. Komline
BY Watson, Cole, Grindle & Watson
ATTORNEY

United States Patent Office 3,054,663
Patented Sept. 18, 1962

3,054,663
COMPOSTING APPARATUS
Thomas R. Komline, Gladstone, N.J., assignor to Komline-Sanderson Engineering Corporation, Peapack, N.J., a corporation of New Jersey
Filed Aug. 27, 1959, Ser. No. 836,403
7 Claims. (Cl. 23—259.1)

This invention relates to apparatus for continuously and rapidly decomposing and stabilizing organic material such as sewage and garbage to convert such material into a useful and valuable product, namly, a compost material which is substntially free of odors and harmful bacteria and which constitutes a valuable and useful substance for addition to the soil as a fertilizer and/or soil conditioner.

The problem of disposal of municipal wastes, including especially sewage and garbage is becoming rapidly of increasing importance. The sludge resulting from conventional treatment methods is objectionable esthetically, and its use as a fertilizer for edible crops is generally considered rather risky due to the possibility of harmful bacteria remaining in the sludge despite its treatment. Moreover, many municipal sewage treatment plants are incapable of handling the additional load that is imposed thereon due to the solids added by domestic garbage grinders which discharge the ground garbage into the sewage lines. For this reason, many towns have found it necessary to pass ordinances prohibiting the installation of domestic garbage grinders.

It is a primary purpose of the instant invention to provide an apparatus which is capable of continuously handling large amounts of solids, including both garbage and sewage sludge, derived from a municipal or other sewage system, whereby the sewage system may effectively handle and dispose of both the garbage and sewage of a municipality and effectively transform these into a useful product which will help to offset the expense of operating the sewage treatment facilities and may, in fact, result in a profitable operation.

The apparatus contemplated by the invention for this purpose broadly includes a generally cylindrical hollow drum, which rotates about a substantially horizontal axis and has openings at its ends for receiving and discharging the organic material to be treated. The material, consisting of solids derived from the sewage, or of garbage, which, if desired, may also be derived from the sewage, is delivered to the intake end of the drum, where it is received in the first of a series of annular axially-aligned compartments into which the drum is subdivided by means of annular walls or partitions fixed within the drum. Prior to and during its treatment in the drum, the material may, if desired, be inoculated with suitable aerobic bacteria, or other additive for bulk. During treatment, its moisture content may be controlled by suitable means, and/or similarly, means may be provided for control of its temperature to maintain it at an optimum point. Such means in and of themselves, however, constitute no part of the instant invention, but may be purely conventional and in accordance with heretofore established practices in the art.

It will be understood that batches of material to be treated are delivered at suitable intervals into the intake end and thus the intake compartment of the drum, and at suitable intervals each such batch is transferred from one compartment to the next succeeding compartment until it finally reaches the discharge end of the drum and is eventually discharged in its fully treated condition. Novel means are provided for selectively transferring the material from any one compartment to an adjoining compartment, such means comprising a conveyor, which may assume the form of an inclined chute which is supported for movement in an axial direction through the drum and its several partitions, whereby it may be positioned to extend through any selected partition from one compartment to the next. Disposed within the drum in the various compartments thereof are generally axially extending vanes or agitators which rotate with the drum. In addition to causing a constant tumbling and agitation of the material incident to rotation of the drum, it will be seen that these also deliver the material within any drum onto the conveyor when the latter is properly positioned, whereby the material will then be transferred into the next adjoining drum.

In accordance with a further aspect of the invention, the said conveyor or chute may be positioned to project axially through either the annular partition of the discharge end of the drum or that at the intake end of the drum, whereby it may be employed selectively as an intake or feed chute or conveyor, as a discharge chute or conveyor, or as a transfer conveyor in the manner described.

The conveyor may be mounted on a suitable trackway for selectively positioning as above mentioned, and for thus positioning it, any suitable means may be employed, as, for instance, a boom movable through the partitions in an axial direction, and actuated by usual hydraulic, electrical or mechanical means; or as illustrated in the accompanying drawings, the conveyor is movable along a trackway by means including a flexible cable system in which the cable is in the form of a loop supported about pulleys externally of the drum, but with a run or portion thereof extending in an axial direction through the drum and connected to the chute. Power means for positioning the chute may comprise a usual reversible electrical motor in driving relation with the said cable loop.

In the accompanying drawings there is illustrated a preferred embodiment of a rotary drum composting apparatus exemplifying the several features of the invention.

In said drawings:

FIGURE 1 is a side elevation of a rotary drum composting apparatus in accordance with the invention, a portion of the drum structure being broken away to permit a view of the interior thereof.

FIGURE 2 is a section on the line 2—2 of FIGURE 1.

FIGURE 3 is an enlarged perspective view of the inclined chute.

Referring now in detail to the accompanying drawing, the numeral 10 designates a generally cylindrical hollow drum, which is supported for rotation about a generally horizontal axis coincident with its cylindrical axis. To this end, the drum is provided at relatively spaced axial locations with external supporting rings each designated 11. Each of these rings is supported for rotation on a pair of relatively spaced flanged wheels or sheaves 12, each of which has its shaft 13 disposed parallel to the axis of the drum and rotatably supported between bearings 14—14, which in turn rest on blocks 15—15 mounted upon a base 16.

For imparting rotation to these drums, there may be conveniently employed an electric driving motor such as 17 in FIGURE 2, connected through a usual drive belt 18 with a driven sheave 19 keyed on the shaft 13 of the adjacent drum-supporting wheel 12. If desired, such a drive may be imparted to one of the wheels 12 of each conveyor.

Internally the drum 10 has affixed thereto a multiplicity of relatively axially spaced annular walls or partitions 20, 20a, and 20b. The annular partition 20a in the present embodiment is located at the intake end of the drum and its inner periphery defines an infeed end opening 21. The annular partition 20b at the opposite axial extremity of the drum serves to define by its inner periphery a discharge opening or outlet 22 for the drum. It will be apparent that the interior annular partitions or walls 20 divide the interior of the drum into a plurality of axially aligned composting compartments 24 to 29, inclusive, all of which communicate with each other through the central openings 23 of their respective partitions 20.

Agitating means for constantly lifting and tumbling the contents of each compartment incident to rotation of the drum comprises suitable generally axially extending vanes or agitators 30, all of similar construction, extending generally radially to the rotational axis of the drum, with a plurality of such agitators 30 disposed in relatively angularly spaced relationship around the interior of each compartment 24 to 29 inclusive. It will be readily apparent that these agitators serve constantly to mix and tumble the contents of their respective compartments to maintain the material therein in a fluent or generally granular and easily handled state and to permit free access of the air to all portions of the material.

Loading and discharging of batches of material to and from the drum and transfer thereof from one compartment to another within the drum is effected by a suitable conveyor which, in the present embodiment assumes the form of an inclined chute 31 which is supported on a trackway defined by the parallel spaced rails 32—32 for movement axially through the drum and for selective positioning through any of the openings 21, 22 or 23 defined by the annular walls or partitions of the drum.

Considering this conveyor structure in more detail, it will be seen from FIG. 3 that the conveyor constitutes an inclined chute of generally U-shaped cross-section, the inclination being downwardly and toward the discharge end of the drum whereby the conveyor will always tend to deliver material towards the discharge end. Relatively opposed rollers 33 rotatably supported on opposite sides of the chute 31 adjacent its upper end are respectively received and guided in the trackways or rails 32—32 for movement therealong. The forward or lower end of the chute 31 is suspended and supported by hangers 34 respectively, each of which has its upper end connected to the shaft of a roller 35. The rollers 35 are respectively received and guided in the rails 32, whereby they cooperate with the rollers 33 in supporting the chute 31 at a fixed inclination for movement axially through the drum 10.

As is illustrated in FIGURE 1, the opposite ends of the respective rails 32 project outwardly from the drum through the infeed and discharge openings 21 and 22 and are fixedly supported by vertical standards 36. Preferably these rails 32 are of generally C-shaped cross-section, as is shown in FIGURE 2, with the slots 37 therein directly transversely opposed to each other, whereby they may receive the rollers 33 and 35.

For moving the chute 31 to any of its various operative positions or stations along the trackway defined by rails 32, there is provided an endless cable 38 supported about a series of pulley sheaves 39 to 43, inclusive, as is indicated diagrammatically in FIGURE 1. With this arrangement, the cable 38 has its upper horizontal run disposed in a generally axial direction through the drum 10 and the chute 31 is connected by means of a bracket 44 to this said run of the cable for movement therewith. Inasmuch as the apparatus here described will normally be of very substantial size and weight, it is desirable that power means be provided for actuating the cable 38 to shift the chute 31 from one position to another. For this reason, the pulley 42 is keyed and driven by output shaft 44 of a suitable and conventional reversible electric motor 45, which will be understood to have a manually controllable forward and reverse switch (not shown).

Also to prevent slippage, the pulley 43 may constitute a take-up idler pulley for the cable and accordingly may be spring-loaded toward the cable or otherwise arranged in usual manner to accomplish its take-up function.

In the operation of the apparatus, which is believed to be apparent from the foregoing, whenever it is desired to deliver a fresh charge of material into drum 10 for processing, the motor 45 is actuated to position the chute 31 in the broken line position designated by the reference character A in FIGURE 1, wherein it is operatively disposed through the infeed opening 21 of the drum with its upper end externally thereof for reception of the incoming charge of material. The material delivered into the external end of the chute will be delivered by the chute into the first compartment 24 of the drum. It will be understood that the material, either prior to or after its reception in this compartment 24, will be suitably conditioned and, if desired, inoculated with aerobic bacteria to promote and speed up the chemical and/or bacterial reactions which occur. Other conditioning materials such as top soil, humus or bulk additive, also may be added. Due to the rotation of the drum, this material will be constantly raised and tumbled by the action of the vanes 30, whereby it will be maintained in a generally loose condition and all portions thereof rendered freely penetrable by the air within the drum to further the bacterial action. When the material has remained and been treated in the compartment 34 for a sufficient period of time, it is then transferred to the next succeeding and adjoining compartment where it remains and is further treated. Such transfer from any one compartment to the other may be readily accomplished by actuating the motor 45 to position the chute 31 through the opening 23 in the partition separating said compartments, in the manner clearly shown in full lines in FIG. 1. With the chute thus positioned, it will be readily apparent that the material within the compartment 24, for instance, will be raised by the vanes or buckets 30 as the drum rotates and dropped or released by gravity from them onto the conveyor 31, from whence it will be carried through the opening 23 in the annular partition which separates compartments 24 and 25 and delivered into compartment 25. When it is not desired to effect any transfer of the material from one compartment to another or to discharge it from the last compartment 29, the chute is maintained in its infeed position designated by the reference character A in FIGURE 1. It will be understood that the various compartments of the drum will normally be successively filled and the material will thus progress in succession toward the discharge end of the drum from one compartment to the next, the chute being manipulated in obvious manner for this purpose. The material within the last compartment 29 may be discharged from the drum whenever desired by positioning the chute 31 as indicated at B in FIGURE 1.

In this application I have shown and described only the preferred embodiment of my invention. However, I recognize that my invention is capable of other and different embodiments and that its several details may be modified in various ways, all without departing from my invention, as defined in the appended claims. Accordingly, the drawings and description herein are to be construed as merely illustrative in nature and not as restrictive.

Having thus described my invention, I claim:

1. A rotary drum composting apparatus comprising a generally cylindrical hollow drum having openings at both axial ends, said ends respectively constituting material intake and discharge ends, a multiplicity of annular walls coaxially supported within said drum respectively at said intake and discharge ends and in uniformly axially spaced relation therebetween, said walls dividing the drum into a plurality of axially aligned composting compartments communicating with each other through their said annular walls, means supporting said drum for rotation about its cylindrical axis, a trackway extending axially through said drum and across the respective annular walls, a conveyor having intake and discharge ends relatively spaced apart by a distance less than the axial extent of the drum, said conveyor being supported for bodily axial movement along said trackway, vanes carried by the drum within said compartments and operative responsive to rotation of the drum for delivering the contents thereof onto said conveyor and means operatively connected to said conveyor for selectively positioning it across any of said walls with its intake and discharge ends respectively disposed in relatively adjoining compartments on opposite sides of said wall.

2. A rotary drum composting apparatus comprising a generally cylindrical hollow drum having material intake and discharge openings at its opposite axial ends, a multiplicity of annular walls coaxially supported within said drum between said intake and discharge ends in uniformly axially spaced relation, said walls dividing the drum into a plurality of axially aligned composting compartments communicating with each other through their said annular walls, means supporting and rotating said drum about its cylindrical axis, generally axially disposed vanes carried by the drum within the respective compartments for moving the contents of said compartments to positions in the upper portion of each, then discharging it by gravity, a trackway extending axially through said drum and across the respective annular walls, a conveyor having intake and discharge ends relatively spaced apart axially of the drum by a distance less than twice the axial spacing between said uniformly spaced annular walls, said conveyor being supported for movement along said trackway and means operatively connected to said conveyor for selectively positioning it across any of said walls with its intake and discharge ends respectively disposed in relatively adjoining compartments on opposite sides of said wall.

3. A rotary drum composting apparatus comprising a generally cylindrical hollow drum, a multiplicity of annular walls coaxially supported within said drum in relatively uniformly axially spaced relation, certain of said walls defining intake and discharge openings respectively for said drum, said walls dividing the drum into a plurality of axially aligned composting compartments communicating with each other through their said annular walls, means supporting and rotating said drum about its cylindrical axis, a trackway extending axially through said drum and its respective annular walls, a conveyor having intake and discharge ends relatively spaced apart axially of the drum by a distance less than twice the axial spacing between said uniformly spaced annular walls, said conveyor being supported for movement along said trackway for selective positioning across any one of said walls, means fixed within the respective compartments for rotation with said drum for agitating the material within the respective compartments and for delivering said material onto said conveyor whereby said conveyor is operative to transfer material from any of said compartments to an adjoining compartment and to discharge material from the discharge end of said drum, and means operatively connected to said conveyor for selectively positioning it across any of said walls with its intake and discharge ends respectively disposed in relatively adjoining compartments on opposite sides of said wall.

4. A rotary drum composting apparatus comprising a generally cylindrical hollow drum normally open at both axial ends, said ends respectively constituting material intake and discharge ends, a multiplicity of annular walls coaxially supported within said drum respectively in uniformly axially spaced relation, certain of said walls defining intake and discharge openings at opposite axial ends of the drum, said walls dividing the drum into a plurality of axially aligned composting compartments communicating with each other through their said annular walls, a trackway extending axially through said drum and across the respective annular walls, an axially inclined chute having intake and discharge ends relatively spaced apart axially of the drum by a distance less than twice the axial spacing between the uniformly spaced annular walls, said chute being supported for movement along said trackway for selective positioning across any one of said walls with its intake and discharge ends on opposite sides thereof, whereby it may function selectively to deliver material into the intake opening of said drum, to transfer material from any of said compartments to an adjoining compartment, and to discharge material through the discharge opening of said drum, means operatively connected to said conveyor for selectively positioning it across any of said walls, and radially inwardly projecting vanes within the respective compartments connected to the drum for rotation therewith to deliver the contents of one of said compartments onto the chute incident to rotation of the drum.

5. A rotary drum composting apparatus comprising a generally cylindrical hollow drum open at both ends, a multiplicity of annular partitions uniformly spaced axially apart within said drum and dividing said drum into a plurality of axially aligned composting compartments, means mounting said drum for rotation about its cylindrical axis, and means operatively connected with the drum for causing such rotation, a trackway extending axially through said drum and across said annular partitions, an inclined chute having intake and discharge ends relatively spaced apart axially of the drum by less than twice the uniform space between said partitions, said chute being supported for movement along said trackway and selectively positionable across any of the partitions between adjoining compartments to receive material delivered thereunto in one compartment incident to rotation of said drum and to deliver it across one of said partitions into an adjoining compartment.

6. A rotary durm composting apparatus comprising a generally cylindrical hollow drum open at both ends, a multiplicity of annular partitions spaced axially apart within said drum and dividing said drum into a plurality of axially aligned composting compartments, means mounting said drum for rotation about its cylindrical axis, and means operatively connected with the drum for causing such rotation, a conveyor having intake and discharge ends relatively spaced axially of the drum by a distance less than twice the axial spacing between adjoining said annular walls, and means within the drum supporting said conveyor for movement axially through the drum to any of various selected positions wherein it extends generally axially through one of said annular partitions between adjoining compartments to receive material delivered thereonto in one compartment incident to rotation of said drum and to deliver it across said one partition into an adjoining compartment.

7. A rotary drum composting apparatus comprising a generally cylindrical hollow drum open at both ends, a multiplicity of annular partitions spaced axially apart within said drum and dividing said drum into a plurality of axially aligned composting compartments, means mounting said drum for rotation about its cylindrical axis, and means operatively connected with the drum for causing such rotation, a conveyor having intake and discharge ends relatively spaced axially of the drum by a distance less than twice the axial spacing between adjoining said annular walls, and means supporting said conveyor for bodily movement axially through the drum to various selected axial positions within said drum with its intake and discharge ends in different compartments for transferring material from any said compartment axially through one of said annular partitions.

References Cited in the file of this patent

UNITED STATES PATENTS

| | | |
|---|---|---|
| 1,329,061 | Paridon | Jan. 27, 1920 |
| 1,804,399 | Cole | May 12, 1931 |
| 2,848,198 | Bill | Aug. 19, 1958 |